United States Patent [19]

Fiorentini

[11] Patent Number: 4,802,770
[45] Date of Patent: Feb. 7, 1989

[54] HIGH PRESSURE MIXING DEVICE

[75] Inventor: Carlo Fiorentini, Varese, Italy

[73] Assignee: Afros S.p.A., Varese, Italy

[21] Appl. No.: 89,990

[22] Filed: Aug. 27, 1987

[30] Foreign Application Priority Data

Sep. 25, 1986 [IT] Italy .................... 21815 A/86

[51] Int. Cl.⁴ .................... B01F 5/04; B01F 15/02
[52] U.S. Cl. .................... 366/177; 137/625.4;
222/145; 366/159; 366/189; 366/268; 366/269;
422/133; 425/4 R; 425/207; 521/99
[58] Field of Search ............... 366/101, 134, 96, 137,
366/131, 159–162, 189, 168, 269, 177, 267, 268,
179; 422/133, 128, 224, 242; 137/625.4, 625.48,
242; 425/130, 200, 207, 205, 217, 4 R, 257, 543,
561, 562, 817 R; 264/39, 45.3, DIG. 83, 53;
222/136, 149, 145, 318; 521/82, 99, 133, 170,
917

[56] References Cited

U.S. PATENT DOCUMENTS

| | | | |
|---|---|---|---|
| 3,706,515 | 12/1972 | Keuerleber et al. | 425/4 R |
| 3,975,128 | 8/1976 | Schluter | 425/207 |
| 4,070,008 | 1/1978 | Schlieckmann | 366/189 X |
| 4,115,299 | 9/1978 | Muhle | 521/170 |
| 4,193,701 | 3/1980 | Koch et al. | 366/177 X |
| 4,332,335 | 6/1982 | Fiorentini | 222/145 |
| 4,418,041 | 11/1983 | Johnson et al. | |
| 4,440,500 | 4/1984 | Schneider | 366/177 |
| 4,452,919 | 6/1984 | Schneider | 366/189 X |
| 4,473,531 | 9/1984 | Macosko et al. | 422/133 |
| 4,592,657 | 6/1986 | Taubenmann | 366/177 X |
| 4,600,312 | 7/1986 | Scrivo | 366/159 |
| 4,707,339 | 11/1987 | Johnson et al. | |
| 4,740,089 | 4/1988 | Fiorentini | |

FOREIGN PATENT DOCUMENTS

| | | |
|---|---|---|
| 0070486 | 4/1983 | European Pat. Off. |
| 99045 | 1/1984 | European Pat. Off. |
| 3617287 | 11/1987 | Fed. Rep. of Germany |

OTHER PUBLICATIONS

EPO Search Report, May 1988.
Polyurethane Handbook, Edited by Dr. Gunter Oertel, Pub. 1985 pp. 144–155.

Primary Examiner—Timothy F. Simone
Attorney, Agent, or Firm—Cushman, Darby & Cushman

[57] ABSTRACT

The invention refers to a high-pressure mixing device, for at least two chemical components to be mixed, in particular of the type having a movable mixing chamber, in which the mixing chamber communicates with an outlet duct for discharging the mixture therefrom through a lateral passage and in which the component inlet apertures open directly into the mixing chamber but are oriented so as to face away from the lateral passage in a direction which is opposite to the flow of the mixture in the outlet duct.

5 Claims, 2 Drawing Sheets

HIGH PRESSURE MIXING DEVICE

BACKGROUND OF THE INVENTION

This invention refers to high-pressure mixing devices for reactive liquid components, such as isocyanate and polyol, for the preparation of polyurethane mixtures, and refers in particular to a high-pressure mixing head of the type having a movable chamber provided in a slider, already described and claimed in a previous patent application of the same applicant.

In the preparation of polyurethane mixtures and, in general, in mixing by injecting reactive chemical components into a high-pressure mixing chamber, in which the components must be mixed intimately and quieted before being fed or poured into a mold, there are three particular moments in each mixing process which prove to be of the utmost importance in order to achieve an efficient admixture of the components and high-quality molded articles; these moments concern the initial feeding and mixing phase during which the components are introduced into a still empty mixing chamber; the intermediate mixing phase which continues for the length of time required to feed the desired quantity of mixture into the mold, and the final mixing phase during which the feeding of the components is stopped and the mixing chamber and its discharge duct are cleaned of any residues of mixture remaining in them.

The initial and final moments of each mixing process prove to be particularly critical under certain circumstances due to the fact that portions not yet perfectly mixed homogeneously, or small unmixed quantities of the components, could be discharged from the mixing chamber and fed into the mold too soon, thus giving rise to faulty molded articles which must be removed and discarded. This problem is particularly serious in the production of technical articles which call for a strict control of their characteristics, which are affected by the mixing degree of the chemical components.

A careful analysis of the phenomenon shows that the presence of even very small quantities of imperfectly mixed components, at the beginning and at the end of each mixing phase or shot, which constitute defects in the molded articles, depends upon the modalities used for mixing the components and in particular upon the disposition and orientation of the nozzles or the inlet apertures of the individual components in the mixing chamber. In fact, in the known mixing devices, as a result of the disposition of the mixing chamber and the orientation of the components inlet apertures or nozzles which are at right angles to the axis of the chamber or in a direction facing towards the mixture outlet, at the beginning of the mixing phase when the components are introduced under pressure into the still empty mixing chamber, they tend to flow towards the outlet duct and are fed into the mold in a not yet perfectly mixed condition. This phenomenon also occurs during the final part of the mixing when the feeding of the components is interrupted; this can be explained by the fact that during these moments there is insufficient kinetic energy and turbulence in the mixture within the mixing chamber to ensure efficient and homogeneous mixing of the components.

This invention is intended to provide a mixing device of the kind described previously, which is capable of remedying the aforementioned problems, that is to say, capable of preventing the formation of a not perfectly homogeneous mixture and of preventing imperfectly mixed components from flowing towards the mold, at the beginning and end of each mixing operation or shot.

A further scope of this invention is to achieve all this with highly efficient means while keeping the mixing device extremely simple, both structurally and functionally.

A still further scope of this invention is to provide a mixing device capable of creating mixing conditions which contribute towards further improving the mixture throughout the entire mixing phase.

BRIEF DESCRIPTION OF THE INVENTION

All this can be achieved by means of a mixing device according to the invention, comprising a mixing chamber, inlet apertures for feeding the components to be mixed into said mixing chamber, and an outlet duct for discharging the mixture, said mixing chamber communicating with said outlet duct through a lateral passage, and in which the inlet apertures for the components open directly into and on the same side of the mixing chamber facing away from said lateral passage in a direction which is opposite to the direction of flow of the mixture in the outlet duct.

According to a particular embodiment of the invention, the mixing chamber is provided in a slider movable at right angles to an through the outlet duct, from a first position in which the mixing chamber is axially aligned with said outlet duct and in which a cleaning plunger is slidingly movable through the mixing chamber and along the aforesaid duct, to a second position in which the mixing chamber is disposed to one side and communicates with the aforesaid outlet duct through a lateral passage, and in which the component feeding apertures open into the mixing chamber on the same side as said lateral passage, and are oriented in a direction which is opposite to the direction of flow of the mixture through the lateral passage and said outlet duct.

BRIEF DESCRIPTION OF THE DRAWINGS

The invention will be described in greater detail hereunder, with reference to the example of the accompanying drawings which do not however include all the possible embodiments of the mixing devices based on the innovatory principles of this invention; in the drawings.

DESCRIPTION OF THE INVENTION

Figure 1:
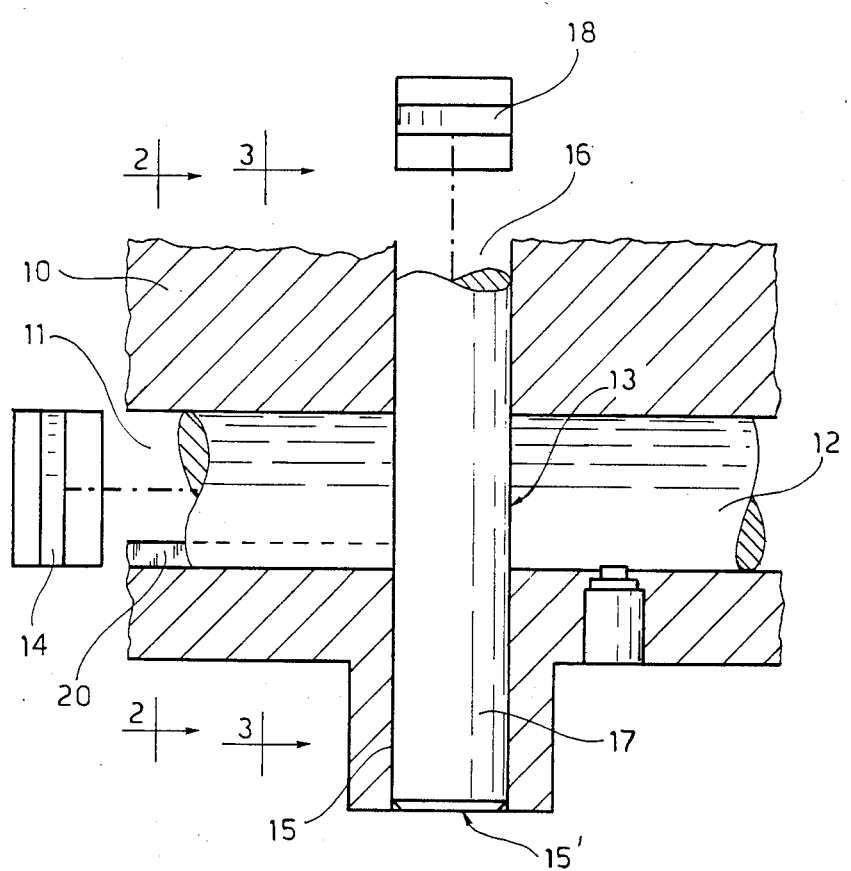
FIG. 1 shows a schematic cross-sectional view of a mixing device according to this invention.
Figure 2:
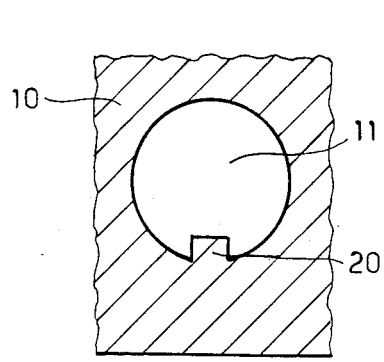
FIG. 2 shows a cross-sectional view along the line 2—2 of FIG. 1.
Figure 3:
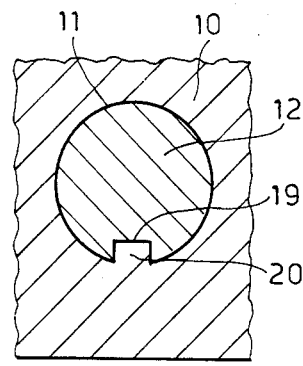
FIG. 3 shows a cross-sectional view along the line 3—3 of FIG 1.

The invention will be illustrated hereunder with reference to a movable-chamber mixing head; however, this exemplificative embodiment must not be understood in the restrictive sense, due to the fact that, without detriment to the fundamental features illustrated here, the invention is applicable to other types or to other embodiments of the mixing devices. According to the example shown, the device comprises a body 10 provided with a channel 11 to guide a slider 12 provided with a cross-through hole 13 defining a mixing chamber having front and rear ends whose longitudinal axis is at right angles to the axis of the slider 12 and its guide channel. The slider 12 of the mixing chamber is made to move from the position shown in FIG. 1 in which the mixing is interrupted, to the mixing position shown in FIG. 4, as explained further on, by means of a control device consisting, for example, of at least one double-acting hydraulic cylinder 14.

The body 10 of the device also comprises an outlet duct 15 for the mixture which crosses the guide channel 11 of the slider 12 and ends with an aperture 15' through which the mixture flows out towards a mold, not shown. The outlet duct 15 for the mixture has its longitudinal axis oriented in the discharging direction of the mixture, which is parallel to the longitudinal axis of the mixing chamber 13, lying in the same plane, and also has a cross-sectional shape and dimension identical to those of the mixing chamber 13.

Figure 4:
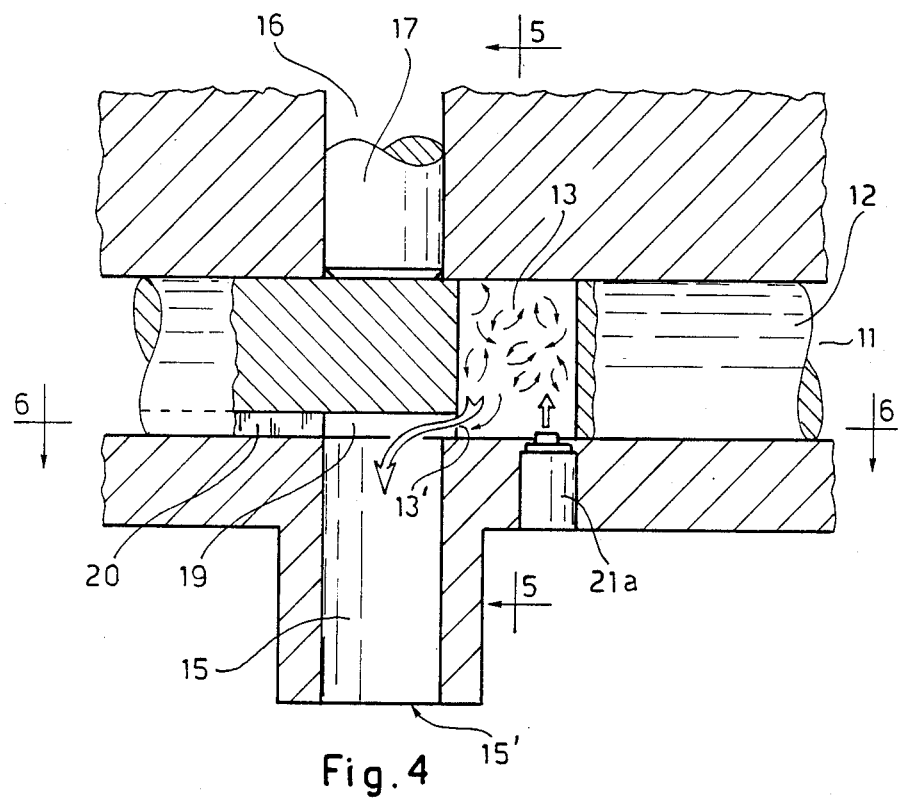
FIG. 4 shows a view similar to that of FIG. 1 of the device in the mixing condition.

The outlet duct 15 of the mixture extends beyond the guide channel 11 of the slider 12, by means of a bore 16 through which slides a cleaning plunger 17 connected to a control member, for example, to a double-acting hydraulic cylinder 18, in order to move it from a retracted position with respect to the guide channel 11 of the slider 12, in which it enables the slider to move, to a forward position which extends through the mixing chamber 13 and along the outlet duct 15, to the outlet aperture 16 for the mixture, in the aligned condition of the chamber 13 and the duct 15 shown in FIG. 4.

In the example shown, the stroke of the slider 12 is greater than the diameter or width of the outlet duct 15 and, therefore, of the mixing chamber 13, measured in the direction in which the slider 12 moves, so that the mixing chamber 13 and the discharge duct 15 communicates by means of a lateral aperture 13' in the side wall of the chamber 13 and an intermediate duct provided by a slot 19, made lengthwise along the slider 12, or otherwise defined by peripheral surfaces of the slider 12 and its guide channel 11. A rib or key 20 extends lengthwise along the guide channel 11 and in the slot 19 of the mixing chamber slider, said rib being opposite the side on which the chamber 13 is situated with respect to the discharge duct 15, in the mixing condition shown in FIG. 4; the rib 20 ends in correspondence with the edge of the duct 15, and serves to clean and free the slot 19 of any residues of mixture when the slider 12 is shifted to the condition shown in FIG. 1 in which the mixing is interrupted.

At the side of the discharge duct 15 in the body 10 of the mixing device, which is opposite the rib 19, are inlet apertures 21, 22, or corresponding nozzles 21a, 22a for feeding chemical components to be mixed intimately into the mixing chamber 13. As shown, the apertures 21, 22 open directly into the mixing chamber 13, in the condition of FIG. 4, and are disposed at the same end of the chamber 13 relative to the outlet aperture 13' for the mixture and are oriented towards the inside or rear end of the chamber 13 facing in a direction away from the aperture 13' or front end of the chamber 13 opposite to the direction in which the mixture flows through the discharge duct 15.

In particular, as shown, it is preferable for the axes of the inlet apertures 21, 22 to form an angle with each other equal to or greater than 45°, for example, an angle of 90°, and for the same inlet apertures to be positioned on the side of the mixing chamber which is opposite to the aperture 13' with respect to the longitudinal plane of symmetry of the mixing chamber, which is at right angles to the slider 12 so that the inlets 21, 22 of the components are positioned as far away as possible from the aperture 13' of the mixing chamber, thus preventing outflow of unmixed components.

Figure 5:
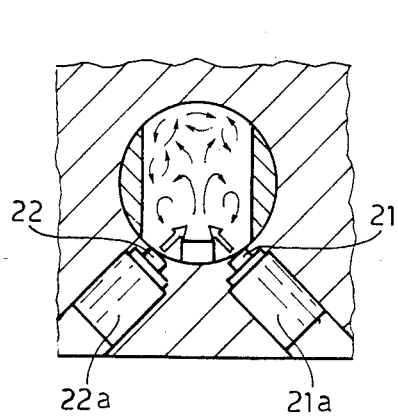
FIG. 5 shows a cross-sectional view along the line 5—5 of FIG. 4.
Figure 6:
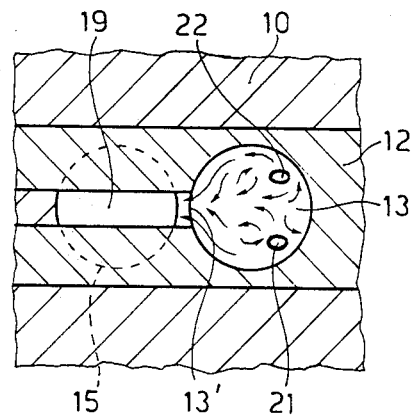
FIG. 6 shows a cross-sectional view along the line 6—6 of FIG. 4.

This particular disposition and orientation of the component feeding or inlet apertures 21, 22 remedies the problems mentioned previously and helps to improve the mixing throughout all the phases of the mixing process. In fact, as illustrated schematically in FIGS. 4 to 6, the jets of components which enter directly into the mixing chamber 13 move away from the aperture 13' and are directed on one side and towards the closed end wall of the chamber itself. No fraction of the initially, albeit imperfectly, formed mixture will leave the chamber 13 until the chamber itself is completely full of mixture thus creating intense turbulence and vorticity within the fluid, which improves the mixing both at the beginning and at the end, and throughout the entire intemediate period of the mixing. In fact, at the beginning of each mixing phase, the components are now directed towards the inside of the chamber 13 in the opposite direction to the flow of mixture in the duct 15 and away from the outlet 13' from the mixing chamber, thus preventing them from reaching the discharge duct 15 and its outlet 16, before the chamber 13 has filled up and only after they have been properly mixed in the most turbulent area which is created towards the closed end of said mixing chamber. The dotten lines and arrows in FIGS. 4, 5 and 6 show the possible path of the flows and whirls in the fluid, in the area of intense turbulence in the chamber 13 from which the streams of perfectly mixed material flow towards the aperture 13' and into the slot 19 which connect the chamber 13 to the discharge duct 15.

Likewise, at the end of the mixing, when the feeding of the components is stopped and the pressure is therefore reduced, the mixing chamber 13 is still completely full of highly turbulent mixture, thereby enabling the components to mix together thoroughly even during the last moments of the mixing.

The device operates as follows: the slider 12 is initially retracted towards the left in the position of FIG. 1, in which the mixing chamber 13 is axially aligned with the discharge duct 15 and the slider 12 interrupts the circulation of chemical components towards the mixing chamber 13, which can therefore be made to recycle individually towards their respective tanks; in this condition, the cleaning plunger 17 is in the forward position, through the mixing chamber 13 and along the discharge duct 15. Whenever it is necessary to carry out a mixing operation, first the cylinder 18 is actuated, moving the plunger 17 backwards completely until the slider 12 is disengaged, then the slider 12 is moved forward to the right by a stroke of pre-established length, greater than the diameter or transversal width of the duct 15, by actuating the respective control cylinder 14 which is hydraulically operated in co-ordination with the cylinder 18. As soon as the slider 12 of the mixing chamber 13 begins to uncover the inlet apertures 21, 22 of the components, they are injected into the still empty chamber but in a direction forming an angle with the axis of the aperture 13' and moving away from the outlet for the mixture, towards the most turbulent area of the mixing chamber, from which the mixture will begin to flow out only after the chamber is completely full. Consequently, no component or quantity of mixture not yet perfectly mixed can leave the chamber 13 and reach the duct 15 beforehand. Only after the mixing chamber 13 is completely full, and after the first few moments of the mixing, will the mixture—homogeneously formed by the intense turbulent effect created in the chamber 13—flow towards the duct 15 and, as the components continue to be fed in, a homogeneous mixture will continue to be formed due to the constant agitation maintained in the portion of the chamber opposite the inlet apertures 21 and 22 as a result of the lateral disposition of the aperture 13'. The perfect mixing of the components can therefore continue until the last moment of the mixing. Consequently, also during the last moments, no component can accidentally leave the mixing chamber 13 until it is perfectly mixed and in the mass of mixture which still fills the chamber 13.

The slider 12 is then made to move back again to the condition of FIG. 1, interrupting the feeding of the components into the chamber 13 which is aligned once more with the discharge duct 15, thereby allowing the cleaning plunger 17 to move forward and expel the residual mixture remaining in the chamber 13 and in the duct 15.

It will be clear, from what has been described and shown in the accompanying drawings, that an improved high-pressure mixing device is provided, the fundamental features of which consist in the lateral disposition of the mixing chamber with respect to the discharge duct for the mixture and in an orientated disposition of the component inlet apertures for the components, with respect to the aperture through which the formed mixture leaves the mixing chamber and flows into the discharge duct, and with respect to the discharge duct itself. By feeding the components into a mixing chamber in a direction facing away from the lateral outlet of the same chamber and opposite to the flow of the mixture in the discharge duct, it is possible to achieve the initially specified scopes, without substantial modifications to the overall structure of the device, with extremely simple means which prove to be highly efficient.

What is claimed is:

1. A high pressure mixing device for mixing a plurality of components comprising:
    a device body having means therein defining first and second bores extending therethrough so that they intersect one another at a right angle; said first bore comprising a discharge duct having an outlet end;
    a first plunger having a constant exterior dimension along its length so as to be in a sliding fit relationship within said first bore;
    a second plunger having a sliding fit relationship with said second bore, said second plunger including means defining a through bore dimensioned to slidingly receive said first plunger therethrough;
    means for injecting components to be mixed including inlet apertures, said injecting means being positioned so as to have said inlet apertures within said second bore and spaced a predetermined distance from said first bore;
    means for moving said first and second plungers in a coordinated manner between advanced and retracted positions, said second plunger being movable between a retracted position, wherein said through bore is coaxially aligned with said first bore, and an advanced position whereby said through bore has been moved so that said inlet apertures are exposed within said through bore with the components mixing in said area defined by said through bore thereby creating a mixing chamber therein, said second plunger further including means defining a lateral passageway when in its advanced position so that a communication passageway is provided between the interior of said mixing chamber and said discharge duct, said injection means being positioned so that the components are injected in a manner that they flow into the mixing chamber in a direction which is opposite to the direction of flow of the resulting mixture within the discharge duct.

2. A mixing device as in claim 1 wherein said inlet apertures open into the mixing chamber at a point spaced from said lateral passageway.

3. A mixing device as in claim 1 wherein said mixing chamber includes an end wall adjacent said lateral passageway and another at the opposite end and said inlet apertures are positioned closer to said opposite end wall than to said end wall.

4. A mixing device as in claim 1 in which said component injecting means have their axis lying in a plane parallel to the longitudinal axis of said mixing chamber, which plane is positioned on the side of said mixing chamber opposite said lateral passage way means.

5. A high pressure mixing head comprising a body provided with first and second intersecting bores, said first bore terminating at an outlet end, first and second plungers slidingly retained within said first and second bores, respectively, means to move said first and second plungers between advanced and retracted positions, said second plunger including a through bore dimensioned to receive said first plunger therethrough when said second plunger is in its retracted position and said through bore is coaxially aligned with said first bore, said through bore comprising a mixing chamber upon the movement of said first plunger to its retracted position clearing said second plunger, thereby defining a discharge duct within said first bore leading to said outlet end, and movement of said second plunger to its advanced position, means for injecting components into said mixing chamber, said injecting means being positioned so as to be opened into the mixing chamber upon the movement of said second plunger to its advanved position, and means defining an outlet passageway connecting said mixing chamber with said discharge duct, wherein said injecting means are oriented so that the flow direction of the components into the mixing chamber is in a direction opposite to the flow direction of the mixed components within said discharge duct.

* * * * *